United States Patent
Murano et al.

(10) Patent No.: US 6,244,426 B1
(45) Date of Patent: Jun. 12, 2001

(54) SPEED-INCREASING AND ACCUMULATING CONVEYOR CHAIN

(75) Inventors: Tetsuya Murano; Seiji Kitagawa; Tomoo Suko, all of Osaka-fu (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/277,050

(22) Filed: Mar. 26, 1999

(30) Foreign Application Priority Data

Mar. 31, 1998 (JP) .................................................... 10-86655

(51) Int. Cl.[7] .................................................. B65G 13/06
(52) U.S. Cl. ............................................ 198/784; 198/850
(58) Field of Search ................................... 198/784, 850

(56) References Cited

U.S. PATENT DOCUMENTS

| | | | |
|---|---|---|---|
| 464,978 | * 12/1891 | Mannesmann . | |
| 1,103,107 | * 7/1914 | Van Dresser . | |
| 1,686,198 | * 10/1928 | Blomstrom . | |
| 3,981,348 | * 9/1976 | Schmucker | 164/149 |
| 4,265,134 | * 5/1981 | Dupoyet | 474/231 |
| 4,331,228 | * 5/1982 | Galarowic | 198/341 |
| 4,736,834 | * 4/1988 | Kotegawa et al. | 198/779 |
| 4,926,529 | * 5/1990 | Hosmer et al. | 26/89 |
| 4,969,548 | * 11/1990 | Kornylak | 193/35 R |
| 4,995,852 | 2/1999 | Takahashi . | |
| 5,035,318 | * 7/1991 | Kawabata et al. | 198/779 |
| 5,120,140 | * 6/1992 | Nakagawa et al. | 384/279 |
| 5,265,334 | * 11/1993 | Lucier | 29/898.02 |
| 5,274,921 | * 1/1994 | Kawagoe et al. | 29/898.059 |
| 5,344,001 | 9/1994 | Kawaai . | |
| 5,412,934 | * 5/1995 | Furuyama | 59/78 |
| 5,461,851 | * 10/1995 | Lehrieder et al. | 59/4 |
| 5,467,860 | 11/1995 | Clopton . | |
| 5,579,579 | * 12/1996 | Chen | 29/898 |
| 5,722,530 | * 3/1998 | Gunschera | 198/803.7 |
| 5,722,888 | * 3/1998 | Lane | 460/114 |
| 5,746,304 | * 5/1998 | Hashino et al. | 198/781.02 |
| 5,785,166 | * 7/1998 | Hoefling et al. | 198/330 |
| 5,826,704 | * 10/1998 | Van Den Goor | 198/851 |
| 5,918,719 | * 7/1999 | Hino et al. | 193/37 |

FOREIGN PATENT DOCUMENTS 5-11212    9/1999   (JP) .

* cited by examiner

*Primary Examiner*—Kenneth W. Noland
(74) *Attorney, Agent, or Firm*—Dann, Dorfman, Herrell and Skillman; Henry H. Skillman

(57) ABSTRACT

A speed-increasing and accumulating conveyor chain includes a large-diameter mounting roller and small-diameter traveling rollers that are loosely fitted concentrically around a connecting pin through over an oil-impregnated sintered oil bushing concentrically. A lubricating oil is gradually discharged from the oil-impregnated sintered bushing, so that the chain can travel with a small chain-driving force as a whole while stably maintaining low friction coefficients at the loosely fitted portions between the connecting pin, the bushing, the mounting roller and the traveling rollers. The chain can, therefore, perform the speed-increasing function and the accumulating function by means of the mounting roller and the traveling rollers.

18 Claims, 2 Drawing Sheets

SPEED-INCREASING AND ACCUMULATING CONVEYOR CHAIN

BACKGROUND OF THE INVENTION

1. Field of the Invention

This invention relates to a speed-increasing and accumulating conveyor chain that can transfer (i.e., increase the speed of) an object to be transferred at a transfer speed faster than the traveling speed of the chain and that can stop (i.e., accumulate) the object while causing the chain itself to continuously travel.

2. Prior Art

Japanese Patent Publication No. HEI. 5-11212 discloses a speed-increasing and accumulating conveyor chain as a conventional example. In a chain of this type, a large-diameter mounting roller and small-diameter traveling rollers are rotatably fitted loosely around a plate connecting pin concentrically through a bushing. The chain has both the function of increasing the speed of an object to be transferred and the function of accumulating such object. That is, when transferring the object while increasing its speed, a frictional force over the rotating surface between the mounting roller and the traveling rollers allows the traveling rollers that are rolling over the rails to gradually impart a rotating force to the mounting roller, thereby causing both the traveling rollers and the mounting roller to roll integrally with one another. The ratio between the diameter of the traveling roller and that of the mounting roller makes the transfer speed of the object faster than the traveling speed of the chain, thereby transferring the object at the increased speed. On the other hand, at the time of accumulation in which the object to be transferred is stopped while abutted against a stopper (i.e., an object stopping unit), slippage is caused between the traveling rollers that are rolling over the rails and the mounting roller that tends to stop. This causes the mounting roller to reversely rotate with respect to the traveling rollers, thereby allowing the object to be stopped at a predetermined position.

The chain of this type has many traveling rollers and mounting rollers arranged along the chain. When the friction coefficient between these rollers and the bushings and the friction coefficient between the bushings and the connecting pins are large, the traction force of the chain as a whole increases, which in turn requires a large chain-driving force. If the traveling rollers and the mounting rollers are made of resin, the friction coefficient between the traveling rollers and the mounting rollers is relatively stable. However, if the traveling rollers and the mounting rollers are made of steel in particular, a lubricating oil or the like is applied between these steel rollers and the bushings and between the bushings and the connecting pins in order to reduce the chain-driving force by stably maintaining the friction coefficient between the traveling rollers and the mounting rollers at a low level.

However, when the oil runs out in such a chain, the friction coefficient between the traveling rollers and the mounting rollers increases, thereby increasing the traction force of the chain as a whole. Thus, from this arises a problem that a large chain-driving force is required. Further, when the oil runs out among these steel rollers, the bushings and the connecting pins, noises such as sliding noises among them and bending noises produced when the chain meshes with sprockets are e caused. These noises impose the restriction of not allowing the chain to be used in quiet working environments in various types of manufacturing industries. Additionally, dust is produced by abrasion, thereby imposing the restriction of not allowing the chain to be used in clean working environments in such manufacturing industries as food, medical and electronic industries.

Still further, when the friction coefficient between the mounting rollers and the object to be transferred increases under an unstable condition at the time of accumulation, so does a force for stopping the object while operating the chain (i.e., line pressure), thereby often causing the trouble of breaking the stopper. Moreover, when the friction coefficient between the mounting rollers and the object to be transferred fluctuates when the accumulating function is reset to increase the speed, the chain is not stably activated to the desired transfer speed. This makes smooth transfer difficult, thus causing negative effects on the process control of a production line.

When oil is lubricated in order to reduce abrasion-caused elongation, sliding noises and bending noises caused between the connecting pins and the bushings of such a speed-increasing and accumulating conveyor chain, the lubricating oil enters into or deposits on portions where the traveling rollers are in contact with the mounting rollers and the outer circumferential surfaces of the traveling rollers. The lubricating oil does retard the acceleration of the transfer speed or does not allow the traveling rollers and the mounting rollers to rotate. Thus, from this arises a problem that the speed-increasing function is not performed sufficiently.

SUMMARY OF THE INVENTION

It is accordingly an object of this invention to provide a speed-increasing and accumulating conveyor chain which can perform a smooth speed-increasing function and an accumulating function without requiring an excessively large chain-driving force, which is also free from noises such as bending noises and sliding noises of the chain caused by the shortage of oil, and which is easy to maintain.

To attain the foregoing object, the present invention provides a speed-increasing and accumulating conveyor chain which comprises a pair of spaced inner plates and a pair of outer plates disposed on an outer side of the respective inner plates and linked on a connecting pin at opposite ends of the connecting pin, an oil-impregnated sintered bushing loosely mounted on the connecting pin between the inner plates, and a large-diameter mounting roller and small-diameter traveling rollers that are loosely fitted around the oil-impregnated sintered bushing concentrically.

The oil-impregnated sintered bushing may be divided into two bushing pieces of the same length so as to absorb the twisting of the chain.

The speed-increasing and accumulating conveyor chain may further include an oil-impregnated roller bushing interposed between the mounting roller and each of the traveling rollers. In this case, the mounting roller and the traveling rollers may be made of steel. The oil-impregnated sintered bushing and the oil-impregnated sintered roller bushing preferably have a sintered density in the range of from 6.0 $g/cm^3$ to 7.1 $g/cm^3$.

The speed-increasing and accumulating conveyor chain of this invention uses an oil-impregnated sintered bushing, and thus implements gradual lubrication in which a lubricating oil is gradually discharged from the oil-impregnated sintered bushing. Therefore, low friction coefficients are maintained stably at the loosely fitted portion of the bushing with respect to the mounting roller and the traveling rollers and at the loosely fitted portion of the bushing with respect to the connecting pin. Under the condition in which the friction coefficients are stable at the loosely fitted portions, the chain travels with a small chain-driving force as a whole.

Further, an oil-impregnated sintered roller bushing interposed between the mounting roller and the traveling rollers also implements the aforesaid gradual lubrication. Therefore, low friction coefficients are maintained stably at the loosely fitted portion between the mounting roller and the oil-impregnated sintered roller bushing and at the loosely fitted portion between the traveling rollers and the oil-impregnated sintered roller bushing. The friction coefficients are stable at the loosely fitted portions, and so the speed-increasing function and the accumulating function can be performed sufficiently by the mounting roller and the traveling rollers.

The above and other objects, features and advantages of the present invention will become apparent to those versed in the art upon making reference to the following description and accompanying sheets of drawings in which certain preferred structural embodiments of the present invention are described by way of illustrative examples.

DETAILED DESCRIPTION OF THE PREFERRED EMBODIMENTS

FIGS. 1 to 5 show in cross section speed-increasing and accumulating conveyor chains according to different embodiments of the present invention. In these figures, the chains are illustrated as viewed in a direction of travel of the chains.

Figure 1:
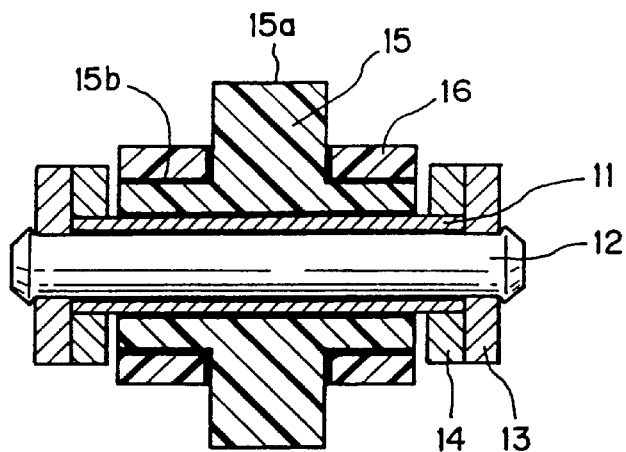
FIG. 1 is a cross-sectional view showing a speed-increasing and accumulating conveyor chain according to a first embodiment of this invention.

The speed-increasing and accumulating conveyor chain shown in FIG. 1 is constructed in accordance with a first embodiment of the present invention. This chain includes two outer plates 13 and 13 press-fitted with opposite ends of a connecting pin 12. The connecting pin 12 is loosely inserted into an oil-impregnated sintered bushing 11. A large-diameter mounting roller 15 is loosely fitted around the oil-impregnated sintered bushing 11. Two inner plates 14 and 14 are press-fitted with opposite ends of the bushing 11. The large-diameter mounting roller 15 is a one-piece roller and has a large-diameter portion 15a and small-diameter boss portions 15b and 15b integrally with one another. The boss portions 15b, 15b are disposed on opposite sides of the large-diameter portion 15a. The diameter of the large-diameter portion 15a is larger than the width of the outer plates 13, 13. A pair of identical small-diameter traveling rollers 16 and 16 is loosely fitted around the boss portions 15b, 15b, respectively. The small-diameter traveling rollers 16, 16 are concentrical with the large-diameter mounting roller 15. The large-diameter mounting roller 15 and the small-diameter traveling rollers 16, 16 are made of an abrasion-resistant resin such as a polyacetal resin.

Using the constructed speed-increasing and accumulating conveyor chain of FIG. 1, an experiment was made to obtain changes in friction coefficient between the mounting roller 15 and a transferred object at the time of accumulation, with the results shown in Table 1. It should be noted that the chain 10 had a pitch of 31.75 mm with the diameter of its mounting roller 15 being 30.6 mm and its width 13.0 mm, the diameter of its traveling roller 16 being 19.05 mm and its width 7.1 mm, and that the chain also had an allowable tensile force of 1.37 kN. The speed of the chain was 15 m/min. The same experiment was repeated for Comparative Examples 1 and 2 as enumerated in Table 1.

TABLE 1

| Changes in Friction Coefficient at the Time of Accumulation | | |
|---|---|---|
| Friction coefficient | At drive start | After 400 hours |
| This embodiment Oil-impregnated sintered bushing (Nonlubricated) | 0.04 | 0.05 |
| Comparative Example 1 Ordinary bushing (Nonlubricated) | 0.05 | 0.095 |
| Comparative Example 2 Ordinary bushing (Lubricated by application) | 0.04 | 0.07 |

When measured after 400 hours have elapsed since the driving start of the chain, the friction coefficient of this embodiment is 0.05, which is a level lower than 0.095 of Comparative Example 1 and 0.07 of Comparative Example 2, as is apparent from Table 1. That is, the friction coefficient of this embodiment is stable at a low level.

Therefore, the speed-increasing and accumulating conveyor chain of FIG. 1 can maintain a low friction coefficient stably at the loosely fitted portion of the oil-impregnated sintered bushing 11 with respect to the mounting roller 15 and the traveling rollers 16 and at the loosely fitted portion of the oil-impregnated sintered bushing 11 with respect to the connecting pin 12. Therefore, generation of bending noises and sliding noises of the chain and production of dust by abrasion at the time of the chain, e.g., meshing with sprockets can be prevented. Thus, the speed-increasing and accumulating conveyor chain can be utilized even in quiet and clean working environments in food, medical and electronic industries and others. In addition, the invention allows the chain to travel while reducing a chain-driving force for generating a traction force of the chain as a whole.

Figure 2:
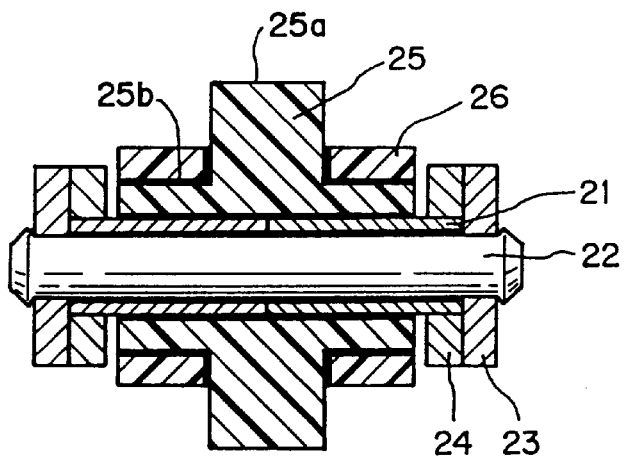
FIG. 2 is a view similar to FIG. 1, showing a speed-increasing and accumulating conveyor chain according to a first embodiment of this invention.

FIG. 2 shows a speed-increasing and accumulating conveyor chain according to a second embodiment of the present invention. The chain includes an oil-impregnated sintered bushing 21 loosely fitted with a connecting pin 22. The bushing 21 is divided into two bushing pieces of the same length for absorbing the twisting of the chain. Two outer plates 23 and 23 are press-fitted with opposite ends of the connecting pin 22. A large-diameter mounting roller 25 is loosely fitted around the oil-impregnated sintered bushing 21 concentrically. Each segment of the longitudinally divided bushing 21 has an outer end press-fitted with a corresponding one of two inner plates 24 and 24. The large-diameter mounting roller 25 is a one-piece roller and has a large-diameter portion 25a and small-diameter boss portions 25b and 25b integrally with one another. The boss portions 25b, 25b are disposed on opposite sides of the large-diameter portion 25a. The diameter of the large-diameter portion 25a is larger than the width of the outer plates 23 and 23. A pair of small-diameter traveling rollers 26 is loosely fitted around the boss portions 25b, 25b, respectively. The mounting roller 25 and the traveling rollers 26 are made of an abrasion-resistant resin such as a polyacetal resin.

The thus constructed speed-increasing and accumulating conveyor chain of FIG. 2 provides operation and effects basically similar to those of the speed-increasing and accumulating conveyor chain of the first embodiment shown in FIG. 1. In addition, the oil-impregnated sintered bushing 21 divided into two identical bushing pieces can absorb the twisting of the chain.

Figure 3:
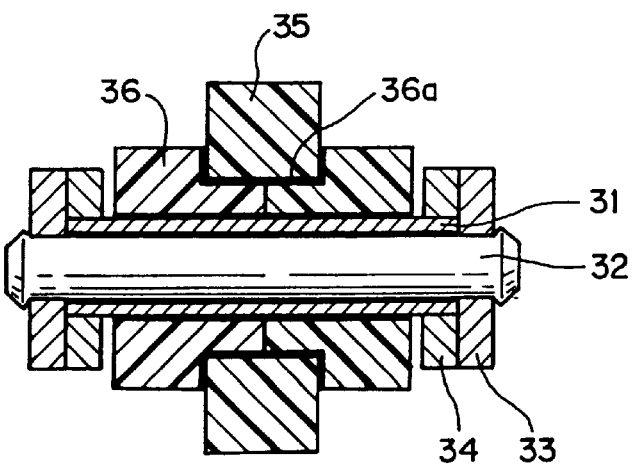
FIG. 3 is a view similar to FIG. 1, showing a speed-increasing and accumulating conveyor chain according to a third embodiment of this invention.

FIG. 3 illustrates a speed-increasing and accumulating conveyor chain according to a third embodiment of the present invention. This chain includes an oil-impregnated sintered bushing 31 loosely fitted with a connecting pin 32, and outer plates 33 and 33 press-fitted with opposite ends of the connecting pin 32. A large-diameter mounting roller 35 is loosely fitted around the oil-impregnated sintered bushing 31 concentrically through two juxtaposed small-diameter traveling rollers 36 and 36. Two inner plates 34 and 34 are press-fitted with opposite ends of the oil-impregnated sintered bushing 31. The mounting roller 35 is constructed only of a large-diameter portion and is loosely fitted with the traveling rollers 36, 36 that are individually rotatable. A reduced-diameter portion 36a is formed on the traveling rollers 36, 36 so as to regulate the movement of the mounting roller 35 over the traveling rollers 36, 36 in a direction parallel with the axis. The mounting roller 35 and the traveling rollers 36, 36 are made of an abrasion-resistant resin such as a polyacetal resin.

The thus constructed speed-increasing and accumulating conveyor chain of FIG. 3 provides operation and effects basically similar to those of the speed-increasing and accumulating conveyor chain of FIG. 1 of the first embodiment shown in FIG. 1. In addition, the mounting roller 35 is loosely fitted around the reduced-diameter portion 36a formed on the traveling rollers 36, 36, so that the ratio of the chain speed to the transfer speed can be further increased.

Figure 4:
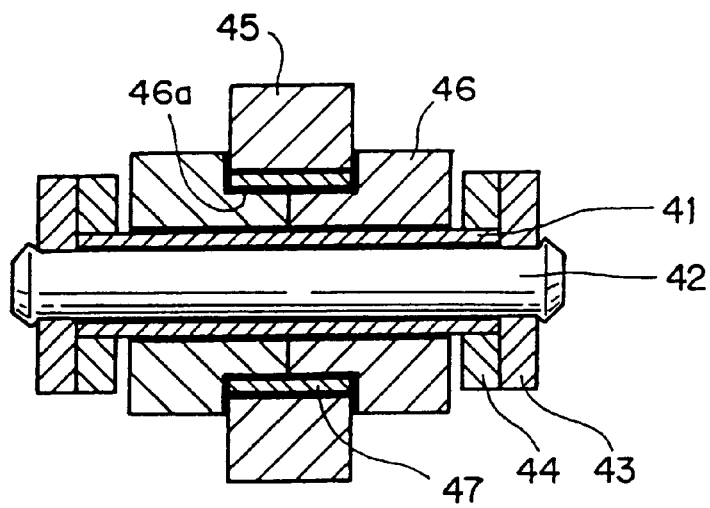
FIG. 4 is a view similar to FIG. 1, showing a speed-increasing and accumulating conveyor chain according to a fourth embodiment of this invention.

As shown in FIG. 4, a speed-increasing and accumulating conveyor chain according to a fourth embodiment of the present invention includes an oil-impregnated sintered bushing 41 loosely fitted with a connecting pin 42, and outer plates 43 and 43 press-fitted over opposite ends of the connecting pin 42. A large-diameter mounting roller 45 is constructed only of a large-diameter portion and is provided on the oil-impregnated sintered bushing 41 concentrically through small-diameter traveling rollers 46 and 46 and an oil-impregnated sintered roller bushing 47. Two inner plates 44 and 44 are press-fitted with opposite ends of the bushing 41. A slender diameter portion 46a is formed on the traveling rollers 46, 46 in order to regulate the movement of the mounting roller 45 in the axial direction of the traveling rollers 46, 46. The mounting roller 45 is loosely fitted around the outer circumference of the oil-impregnated sintered roller bushing 47 that is loosely fitted with the reduced-diameter portion 46a. The mounting roller 45 and the traveling rollers 46, 46 are made of steel similarly to the connecting pin 42, and the inner and outer plates 43 and 44.

The thus constructed speed-increasing and accumulating conveyor chain of FIG. 4 provides operation and effects basically similar to those of the speed-increasing and accumulating conveyor chain of the third embodiment shown in FIG. 3. In addition, the oil-impregnated roller bushing 47 is loosely interposed between the mounting roller 45 and the traveling rollers 46, 46, so that the friction coefficient between the mounting roller 45 and the traveling rollers 46, 46 is stably maintained at a low level. Therefore, the chain can travel with a small traction force and a small chain-driving force for generating such a traction force as a whole. Furthermore, at the time of accumulation, the mounting roller 45 receives a rotating force in the opposite direction from the traveling rollers 46, 46, so that the mounting roller 45 has its rotation controlled by an object that is being transferred. Hence, there is no likelihood that the mounting roller 45 is dragged by the chain or has its rotation controlled by the traveling rollers 46.

Figure 5:
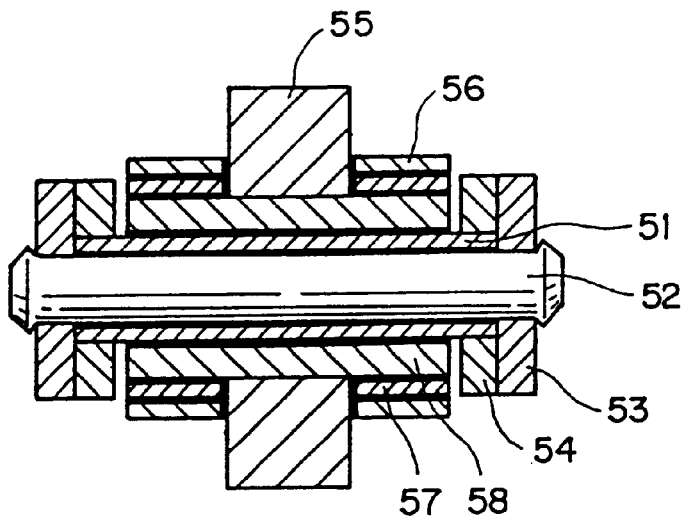
FIG. 5 is a view similar to FIG. 1, showing a speed-increasing and accumulating conveyor chain according to a fifth embodiment of this invention.

FIG. 5 shows a speed-increasing and accumulating conveyor chain according to a fifth embodiment of the present invention. This chain includes an oil-impregnated sintered bushing 51 loosely fitted with a connecting pin 52, and two outer plates 53 and 53 press-fit ted with opposite ends of the connecting pin 52. A large-diameter mounting roller 55, two small-diameter traveling rollers 56, 56, two oil-impregnated sintered roller bushings 57, 57, and a roller bushing 58 are assembled onto the oil-impregnated sintered bushing 51 concentrically. The large-diameter mounting roller 55 is apparently constructed only of a large-diameter roller portion, but it is substantively formed jointly by this roller portion 55 and the roller bushing 58. The small-diameter traveling rollers 56, 56 are disposed on opposite sides of the large-diameter roller portion of the mounting roller 55. Two inner plates 54 and 54 are press-fitted with opposite ends of the bushing 51. The mounting roller 55 is press-fitted with a central portion of the roller bushing 58 so as to be integral with the roller bushing 58 that is loosely fitted with the oil-impregnated sintered bushing 51 concentrically. On both sides between which the mounting roller 55 is interposed, the traveling rollers 56, 56 are loosely fitted through the oil-impregnated sintered roller bushings 57, 57, respectively.

The thus constructed speed-increasing and accumulating conveyor chain of FIG. 5 provides operation and effects basically similar to those of the speed-increasing and accumulating conveyor chain 40 of the fourth embodiment shown in FIG. 4. In addition, the oil-impregnated sintered roller bushing 57 is loosely fitted between the traveling rollers 56 and the roller bushing 58 that is equivalent to the small-diameter boss portions while press-fitted with the mounting roller 55, the friction coefficient between the mounting roller 55 and the traveling rollers 56 is stably maintained at a low level. Therefore, the chain can travel with a small traction force and a small chain-driving force for such a traction force as a whole. In addition, the friction coefficient between the mounting roller 55 and the traveling rollers 56 is maintained at a low level, and therefore the friction coefficient of the surface on which to mount an object to be transferred can be made larger than such friction coefficient between the mounting roller 55 and the traveling rollers 56. Hence, even if there is a difference in angular velocity between the mounting roller 55 and the traveling rollers 56 at their loosely fitted portion, the mounting roller 55 can come in rolling contact with the object to be transferred reliably without slipping the object.

It should be noted that the sintered densities of the oil-impregnated sintered bushing 11; 21; 31; 41; 51 and the oil-impregnated sintered roller bushing 47; 57 preferably range from 6.0 g/cm$^3$ to 7.1 g/cm$^3$. If the sintered densities are less than 6.0 g/cm$^3$, the quantity of a lubricating oil impregnated is insufficient, thereby not providing adequate lubrication for driving the chain for a long period of time. If the sintered densities exceed 7.1 g/cm³, the quantity of a lubricating oil impregnated is excessively large, thereby impairing the sintered strength and thus breaking the chain itself.

It should be further noted that the speed-increasing and accumulating conveyor chains 10, 20, 30, 40 and 50 can improve further safety in transferring work environments by exposing only the large-diameter mounting roller to the outside while interposing a cover between the small-diameter traveling rollers and an object to be transferred.

The speed-increasing and accumulating conveyor chain of this invention provides the following advantageous effects by its construction in which a large-diameter mounting roller and small-diameter traveling rollers are loosely fitted around an oil-impregnated sintered bushing concentrically, the bushing loosely passing a plate connecting pin loosely therethrough, so that a lubricating oil is gradually discharged from the oil-impregnated sintered bushing into the portion where the oil-impregnated sintered bushing loosely passes the connecting pin therethrough and into the portion where such rollers are loosely fitted around the oil-impregnated sintered bushing.

(1) The speed-increasing and accumulating conveyor chain of this invention can stably maintain low friction coefficients at the loosely fitted portion of the bushing with respect to the mounting roller and the traveling rollers and at the loosely fitted portion of the bushing with respect to the connecting pin. Therefore, generation of bending noises and sliding noises of the chains and production of dust by abrasion, e.g., at the time of the chain meshing with sprockets can be prevented. Hence, these chains can be utilized even in quiet and clean working environments. In addition, such chain can travel with a small traction force and hence with a small chain-driving force for generating such traction force as a whole.

(2) The speed-increasing and accumulating conveyor chain of this invention is easy to maintain in terms of lubrication compared with the conventional speed-increasing and accumulating conveyor chain in which the lubricating oil (that tends to remain on the traveling rollers and the rails when the oil is applied because it has run out) has to be wiped off.

Further, the speed-increasing and accumulating conveyor chain of this invention provides the following effects in addition to the effects described in items (1) and (2) by its construction in which a roller bushing is interposed at the loosely fitted portion between the mounting roller and the traveling rollers and, in addition, an oil-impregnated sintered roller bushing is used as such a roller bushing.

(3) The speed-increasing and accumulating conveyor chain of this invention gradually discharges a lubricating oil from the oil-impregnated sintered bushing into the loosely fitted portion between the mounting roller and the traveling rollers, so that the friction coefficients can be stably maintained at low levels at the loosely fitted portion between the mounting roller and the oil-impregnated sintered roller bushing and at the loosely fitted portion between the traveling rollers and the oil-impregnated sintered roller bushing. Therefore, the chain can increase the transfer speed of an object to be transferred to a desired value that is faster than the chain speed smoothly and swiftly at the time of its activation. In addition, there is no likelihood that the chain allows the mounting roller to rotate while accompanied by or sliding with the traveling rollers at the time of its accumulation, and thus the chain can accumulate the object to be transferred smoothly and reliably.

(4) The speed-increasing and accumulating conveyor chain of this invention allows the friction coefficient between the mounting roller and the traveling rollers to be stably maintained at low levels, and in addition, the friction coefficient of the surface on which to mount an object to be transferred can be made relatively larger than such friction coefficient between these rollers. Therefore, the object can be accumulated smoothly and reliably. Hence, there is no danger of the line pressure breaking the stopper, i.e. an object-stopping unit overlying the transfer surface, and thus more accurate process control of production lines can be implemented.

Obviously, various minor changes and modifications of the present invention are possible in the light of the above teaching. It is to be understood that within the scope of the appended claims the present invention may be practiced otherwise than as specifically described.

What is claimed is:

1. A speed-increasing and accumulating conveyor chain comprising:

a connecting pin;

a pair of spaced inner plates and a pair of outer plates disposed on an outer side of the respective inner plates, said inner and outer plates being linked on said connecting pin at opposite ends of said connecting pin;

an oil-impregnated sintered bushing loosely mounted coaxially on said connecting pin between and connected to said inner plates; and a large-diameter mounting roller and small-diameter traveling rollers loosely fitted coaxially around said oil-impregnated sintered bushing;

said oil-impregnated sintered bushing being divided into two bushing pieces having the same length.

2. A speed-increasing and accumulating conveyor chain according to claim 1, wherein said oil-impregnated sintered bushing as a sintered density in the range of from 6.0 g/cm³ to 7.1 g/cm³.

3. A speed-increasing and accumulating conveyor chain according to claim 1, wherein said mounting roller and said traveling rollers are formed from an abrasive-resistant resin.

4. A speed-increasing and accumulating conveyor chain comprising:

a connecting pin;

a pair of spaced inner plates and a pair of outer plates disposed on an outer side of the respective inner plates, said inner and outer plates being linked on said connecting pin at opposite ends of said connecting pin;

an oil-impregnated sintered bushing loosely mounted coaxially on said connecting pin between said inner plates; and a large-diameter mounting roller and small-diameter traveling rollers loosely fitted coaxially around said oil-impregnated sintered bushing; and an oil-impregnated roller bushing coaxial with said mounting roller and said traveling rollers rotatable supporting said mounting roller for rotation on said traveling rollers.

5. A speed-increasing and accumulating conveyor chain according to claim 4, wherein said oil-impregnated sintered roller bushing has a sintered density in the range of from 6.0 g/cm³ to 7.1 g/cm³.

6. A speed-increasing and accumulating conveyor chain according to claim 4, wherein said mounting roller and said traveling rollers are made of steel.

7. A speed-increasing and accumulating conveyor chain according to claim 4, wherein said traveling rollers are loose mounted on said oil-impregnated sintered bushing and have reduced diameter portions extending toward each other coextensive with said mounting roller, said mounting roller being loosely mounted on said reduced diameter extending portions of said traveling rollers.

8. A speed-increasing and accumulating conveyor chain according to claim 7, wherein said oil-impregnated sintered bushing has a sintered density in the range of from 6.0 g/cm$^3$ to 7.1 g/cm$^3$.

9. A speed-increasing and accumulating conveyor chain according to claim 7, wherein said mounting roller and said traveling rollers are formed from an abrasive-resistant resin.

10. A speed-increasing and accumulating conveyor chain according to claim 7, further including an oil-impregnated roller bushing interposed between said mounting roller and said reduced diameter portion of said traveling rollers.

11. A speed-increasing and accumulating conveyor chain according to claim 10, wherein said oil-impregnated sintered roller bushing has a sintered density in the range of from 6.0 g/cm$^3$ to 7.1 g/cm$^3$.

12. A speed-increasing and accumulating conveyor chain according to claim 10, wherein said mounting roller and said traveling rollers are made of steel.

13. A speed-increasing and accumulating conveyor chain comprising:

a connecting pin;

a pair of spaced inner plates and a pair of outer plates disposed on an outer side of the respective inner plates, said inner and outer plates being linked on said connecting pin at opposite ends of said connecting pin;

an oil-impregnated sintered bushing loosely mounted coaxially on said connecting pin between said inner plates, said oil-impregnated sintered bushing being divided into two bushing pieces having the same length;

a large-diameter mounting roller and small-diameter traveling rollers loosely fitted coaxially around said oil-impregnated sintered bushing; and said mounting roller being a one-piece mounting roller loosely mounted on said oil-impregnated sintered bushing, said one-piece mounting roller including a large-diameter central portion and a pair of small-diameter coaxial portions on opposite sides of said large-diameter central portion, said traveling rollers being loosely mounted coaxially on said boss portions, respectively.

14. A speed-increasing and accumulating conveyor chain according to claim 13, wherein said oil-impregnated sintered roller bushing has a sintered density in the range of from 6.0 g/cm$^3$ to 7.1 g/cm$^3$.

15. A speed-increasing and accumulating conveyor chain according to claim 13, wherein said mounting roller and said traveling rollers are formed from an abrasive-resistant resin.

16. A speed-increasing and accumulating conveyor chain comprising:

a connecting pin;

a pair of spaced inner plates and a pair of outer plates disposed on an outer side of the respective inner plates, said inner and outer plates being linked on said connecting pin at opposite ends of said connecting pin;

an oil-impregnated sintered bushing loosely mounted coaxially on said connecting pin between said inner plates; and a large-diameter mounting roller and small-diameter traveling rollers loosely fitted coaxially around said oil-impregnated sintered bushing;

said mounting roller being a two-piece mounting roller including an inner roller bushing loosely mounted coaxially on said sintered roller bushing, with an outer oil-impregnated sintered roller bushing coaxial with and supported on said inner bushing and interposed between each of said traveling rollers and said inner roller bushing.

17. A speed-increasing and accumulating conveyor chain according to claim 16, wherein said oil-impregnated sintered bushing and said oil-impregnated sintered roller bushing have a sintered density in the range of from 6.0 g/cm$^3$ to 7.1 g/cm$^3$.

18. A speed-increasing and accumulating conveyor chain according to claim 16, wherein said roller bushing and said roller portion of said mounting roller are made of steel, and said traveling rollers are made of steel.

* * * * *